United States Patent [19]

Okamoto

[11] Patent Number: 4,876,716
[45] Date of Patent: Oct. 24, 1989

[54] KEY DISTRIBUTION METHOD

[75] Inventor: Eiji Okamoto, Tokyo, Japan

[73] Assignee: NEC Corporation, Tokyo, Japan

[21] Appl. No.: 88,319

[22] Filed: Aug. 24, 1987

[30] Foreign Application Priority Data

Aug. 22, 1986 [JP] Japan .............................. 61-197610
Aug. 22, 1986 [JP] Japan .............................. 61-197611

[51] Int. Cl.$^4$ ........................... H04L 9/02; H04K 1/00
[52] U.S. Cl. .......................................... 380/21; 380/30; 380/46
[58] Field of Search ............................. 380/21, 30, 46

[56] References Cited

U.S. PATENT DOCUMENTS

| | | | |
|---|---|---|---|
| 4,193,131 | 3/1980 | Lennon et al. | 380/46 |
| 4,218,582 | 8/1980 | Hellman et al. | 380/30 |
| 4,438,824 | 5/1984 | Mueller-Schloer | 380/30 |
| 4,458,109 | 7/1984 | Mueller-Schloer | 380/30 |
| 4,625,076 | 11/1986 | Okamoto et al. | 380/30 |
| 4,658,292 | 4/1987 | Okamoto et al. | 380/21 |
| 4,731,841 | 3/1988 | Rosen et al. | 380/30 |
| 4,748,668 | 5/1988 | Shamir et al. | 380/30 |
| 4,754,064 | 7/1988 | Chaum | 380/30 |
| 4,757,534 | 7/1988 | Matyas et al. | 380/25 |
| 4,759,063 | 7/1988 | Chaum | 380/30 |
| 4,794,644 | 12/1988 | Phillip et al. | 380/21 |
| 4,797,672 | 1/1989 | Kousa | 380/46 |
| 4,799,061 | 1/1989 | Abraham et al. | 380/21 |

FOREIGN PATENT DOCUMENTS

| | | | |
|---|---|---|---|
| 59-72840 | 4/1984 | Japan | 380/21 |
| 59-79654 | 5/1984 | Japan | 380/21 |
| 59-165544 | 9/1984 | Japan | 380/21 |
| 61-23438 | 1/1986 | Japan | 380/21 |
| 61-30828 | 2/1986 | Japan | 380/21 |
| 61-30829 | 2/1986 | Japan | 380/21 |

OTHER PUBLICATIONS

Diffie et al., "New Directions in Cryptography", IEEE Transactions on Information Theory, vol. IT-22, No. 6, Nov. 1976.
Advance Data Sheet CY1024 Key Management Processor, Cylink, Jun. 1986.
Rivest et al., "A Method for Obtaining Digital Signatures and Public-Key Cryptosystems", Communications of the ACM, vol. 21, No. 2, Feb. 1978.

Primary Examiner—Salvatore Cangialosi
Attorney, Agent, or Firm—Sughrue, Mion, Zinn, Macpeak and Seas

[57] ABSTRACT

A key distribution method and system for distributing a key over an insecure communication channel between first and second systems. Both first and second systems generate respective random numbers, calculate key distribution codes based on that random number, public information and information secret to the respective systems, and transmits the distribution codes to the other system. The same key is generated by both systems based on public information, the locally generated random number and the received key distribution codes. Alternatively, the systems may exclude the secret information from the key distribution codes but generate and transmit identification codes based on the secret information, public information and the locally generated random numbers. The received key distribution and identification codes are subjected to a known transformation and compared to known identification of the transmitting system.

12 Claims, 3 Drawing Sheets

KEY DISTRIBUTION METHOD

BACKGROUND OF THE INVENTION

The invention relates to a method of distributing a key for enciphering an unenciphered or plaintext message and for deciphering the enciphered message.

A public key distribution method used in a public key cryptosystem as a well-known key distribution method is disclosed in a paper entitled "New Directions in Cryptography" by W. Diffie and M. E. Hellman, published in the IEEE Transactions on Information Theory, Vol. IT-22, No. 6, pp. 644 to 654, November issue, 1976. The key distribution method disclosed in the paper memorizes public information for each of conversers. In the system, before a converser A sends an enciphered message to a converser B, the converser A prepares an enciphering key (which represents a number obtained by calculating $Y_B{}^{AX}$ (mod p)) generated from public information $Y_B$ of the converser B and secret information $X_A$ which is kept secret by the converser A. The number p is a large prime number of about 256 bits in binary representation, which is publicly known. a (mod b) means a remainder of division of the number a by the number b. The converser B also prepares the key wk in accordance to $Y_A{}^{BX}$ (mod p) in a similar manner. $Y_A$ and $Y_B$ are selected so as to be equal to $\alpha^{AX}$ (mod p) and $\alpha^{BX}$ (mod p), respectively. As a result, $Y_B{}^{AX}$ (mod p) becomes equal to $Y_A{}^{BX}$ (mod p). It is known that even if $Y_A$, $\alpha$ and p are known, it is infeasible for anybody except the converser A to obtain $X_A$ which satisfies $Y_A = \alpha^{AX}$ (mod p).

The prior art key distribution system of the type described, however, has disadvantages in that since the system needs a large amount of public information corresponding to respective conversers, the amount of the public information increases as the number of conversers increases. Further, strict control of such information becomes necessary to prevent the information from being with tampered.

SUMMARY OF THE INVENTION

An object of the invention is, therefore, to provide a key distribution method free from the above-mentioned disadvantages of the prior art system.

According to an aspect of the invention, there is provided a method which comprises the following steps: generating a first random number in a first system; generating first key distribution information in the first system by applying a predetermined first transformation to the first random number on the basis of first secret information known only by the first system; transmitting the first key distribution information to a second system via a communication channel; receiving the first key distribution information in the second system; generating a second random number in the second system; generating second key distribution information by applying the predetermined first transformation to the second random number on the basis of second secret information known only by the second system; transmitting the second key distribution information to the first system via the channel; receiving the second key distribution information in the first system; and generating an enciphering key in the first system by applying a predetermined second transformation to the second key distribution information on the basis of the first random number and identification information of the second system which is not secret.

According to another aspect of the invention, there is provided a method which comprises the following steps: generating a first random number in the first system; generating first key distribution information by applying a predetermined first transformation to the first random number on the basis of public information in the first system and generating first identification information by applying a predetermined second transformation to the first random number on the basis of first secret information known only by the first system; transmitting the first key distribution information and the first identification information to a second system via a communication channel; receiving the first key distribution information and the first identification information in the second system; examining whether or not the result obtained by applying a predetermined third transformation to the first key distribution information on the basis of the first identification information satisfies a first predetermined condition, and, if it does not satisfy, suspending key distribution processing; generating a second random number if said condition is satisfied in the preceding step; generating second key distribution information by applying the predetermined first transformation to the second random number on the basis of the public information, and generating second identification information by applying the predetermined second transformation to the second random number on the basis of second secret information known only by the second system; transmitting the second key distribution information and the second identification information to the first system via the communication channel; and examining whether or not the result obtained by applying a third predetermined transformation to the second key distribution information on the basis of the second identification information in the first system satisfies a predetermined second condition, and if the result does not satisfy the second condition, suspending the key distribution processing, or if it satisfies the second condition, generating an enciphering key by applying a fourth predetermined transformation to the first random number on the basis of the second key distribution information.

BRIEF DESCRIPTION OF THE DRAWINGS

Other features and advantages of the invention will become more apparent from the following detailed description when taken in conjunction with the accompanying drawings in which.

In the drawings, the same reference numerals represent the same structural elements.

PREFERRED EMBODIMENTS

Figure 1:
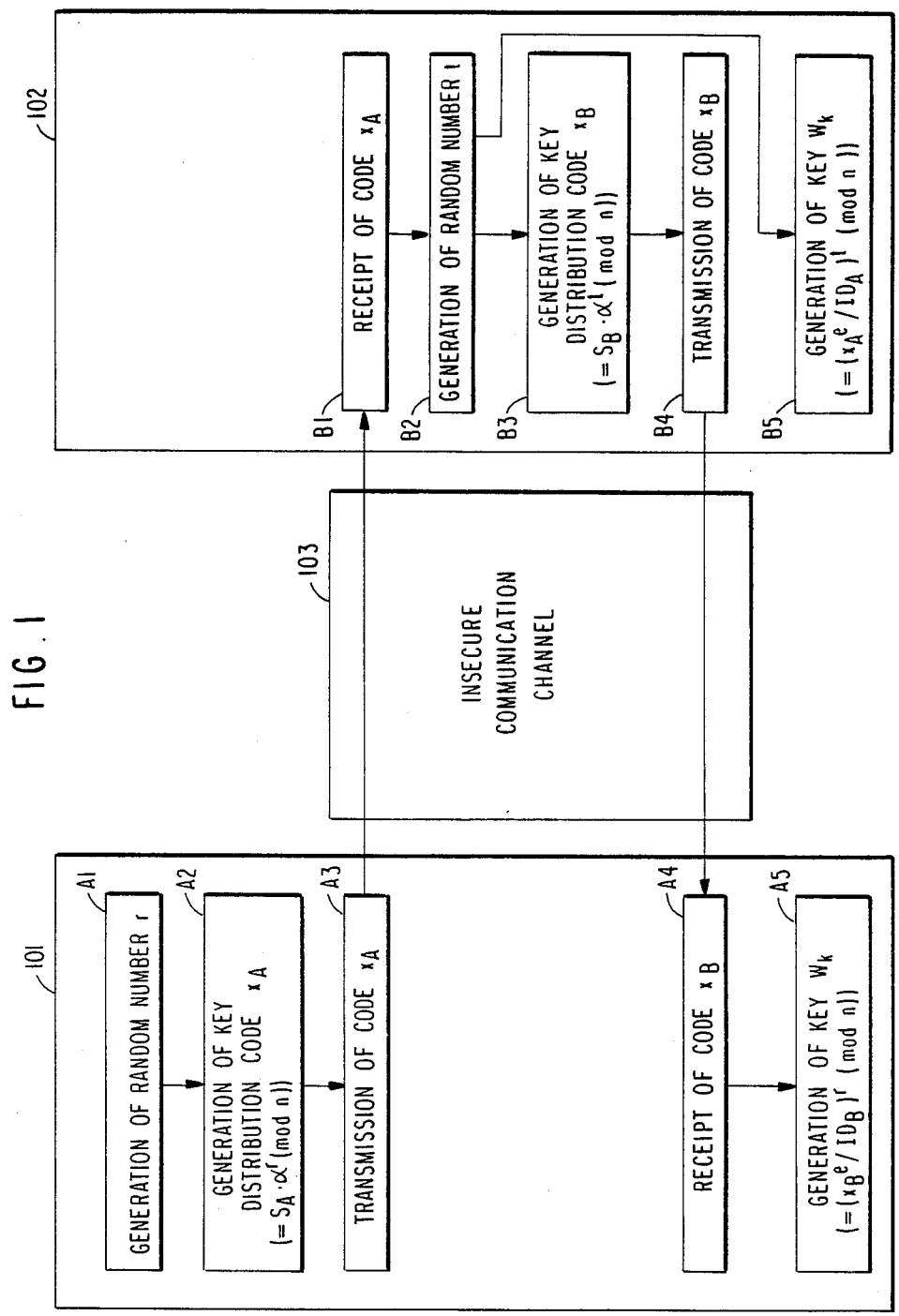
FIG. 1 is a block diagram of a first embodiment of the invention.

Referring now to FIG. 1, a first embodiment of the invention comprises a first system 101, a second system 102 and an insecure communication channel 103 such as a telephone line which transmits communication signals between the systems 101 and 102. It is assumed herein that the systems 101 and 102 are used by users or conversers A and B, respectively. The user A has or knows a secret integer number $S_A$ and public integer numbers e, c, α and n which are not necessarily secret while the user B has or knows a secret integer number $S_B$ and the public integer numbers. These integer numbers are designated and distributed in advance by a reliable person or organization. The method to designate the integer numbers will be described later.

An operation of the embodiment will next be described on a case in which the user A starts communication. The system 101 of the user A generates a random number γ (Step A1 in FIG. 1) and sends a first key distribution code $X_A$ representative of a number obtained by computing $S_A \cdot \alpha^\gamma \pmod{n}$ (Step A2) to the system 102 of the user B (step A3). Next, when the system 102 receives the code $X_A$ (Step B1), it generates a random number t (Step B2), calculates $(X_A{}^e/ID_A)^t \pmod{n}$ (Step B5), and keeps the resulting number as a enciphering key wk for enciphering a message into storage means (not shown). The identification code $ID_A$ represents herein a number obtained by considering as a numeric value a code obtained by encoding the address, the name and so on of the user A. The encoding is, for instance, performed on the basis of the American National Standard Code for Information Interchange. Then, the system 102 transmits to the system 101 of the user A a second key distribution code $X_B$ representative of a number obtained by calculating $S_B \cdot \alpha^t \pmod{n}$ (Steps B3 and B4).

The system 101, on the other hand, receives the code $X_B$ (Step A4), calculates $(X_B{}^e/ID_B)^\gamma \pmod{n}$ (Step A5), and keeps the resulting number as the key wk for enciphering a message. The identification code $ID_B$ represents the numbers obtained by considering as a numeric value a code obtained by encoding the name, address, and so on of the user B.

Subsequently, communication between the users A and B will be conducted by transmitting messages enciphered with the enciphering key wk via the channel 103.

The integer numbers $S_A$, $S_B$, e, c, α and n are determined as follows. n is assumed to be a product of two sufficiently large prime numbers p and q. For instance, p and q may be $2^{256}$ or so. e and c are prime numbers which are equal to or less than n, while α is a positive integer number which is equal to or less than n. Further, d is defined as an integer number which satisfies $e \cdot d \pmod{(p-1) \cdot (q-1)} = 1$. $S_A$ and $S_B$ are defined as numbers obtainable from $ID_A{}^d \pmod{n}$ and $ID_B{}^d \pmod{n}$, respectively.

If $S_A$, $S_B$, e, c, α, and n are defined as above, $ID_A$ and $ID_B$ become equal to $S_A{}^e \pmod{n}$ and $S_b{}^e \pmod{n}$, respectively. This can be proved from a paper entitled "A Method for Obtaining Digital Signatures and Publick-Key Cryptosystems" by R. L. Rivest et al., published in the Communication of the ACM, Vol. 21, No. 2, pp. 120 to 126. Since the key obtained by $(X_B{}^e/ID_B)^r \pmod{n}$ on the side of the user A becomes equal to $\alpha^{ert} \pmod{n}$ and the key obtained by $(X_A{}^e/ID_A)^t \pmod{n}$ on the side of the user B becomes equal to $\alpha^{ert} \pmod{n}$, they can prepare the same enciphering key. Even if a third party tries to assume the identity of the user A, he cannot prepare the key wk since he cannot find out z which meets $ID_A = Z^e \pmod{n}$.

Figure 2:
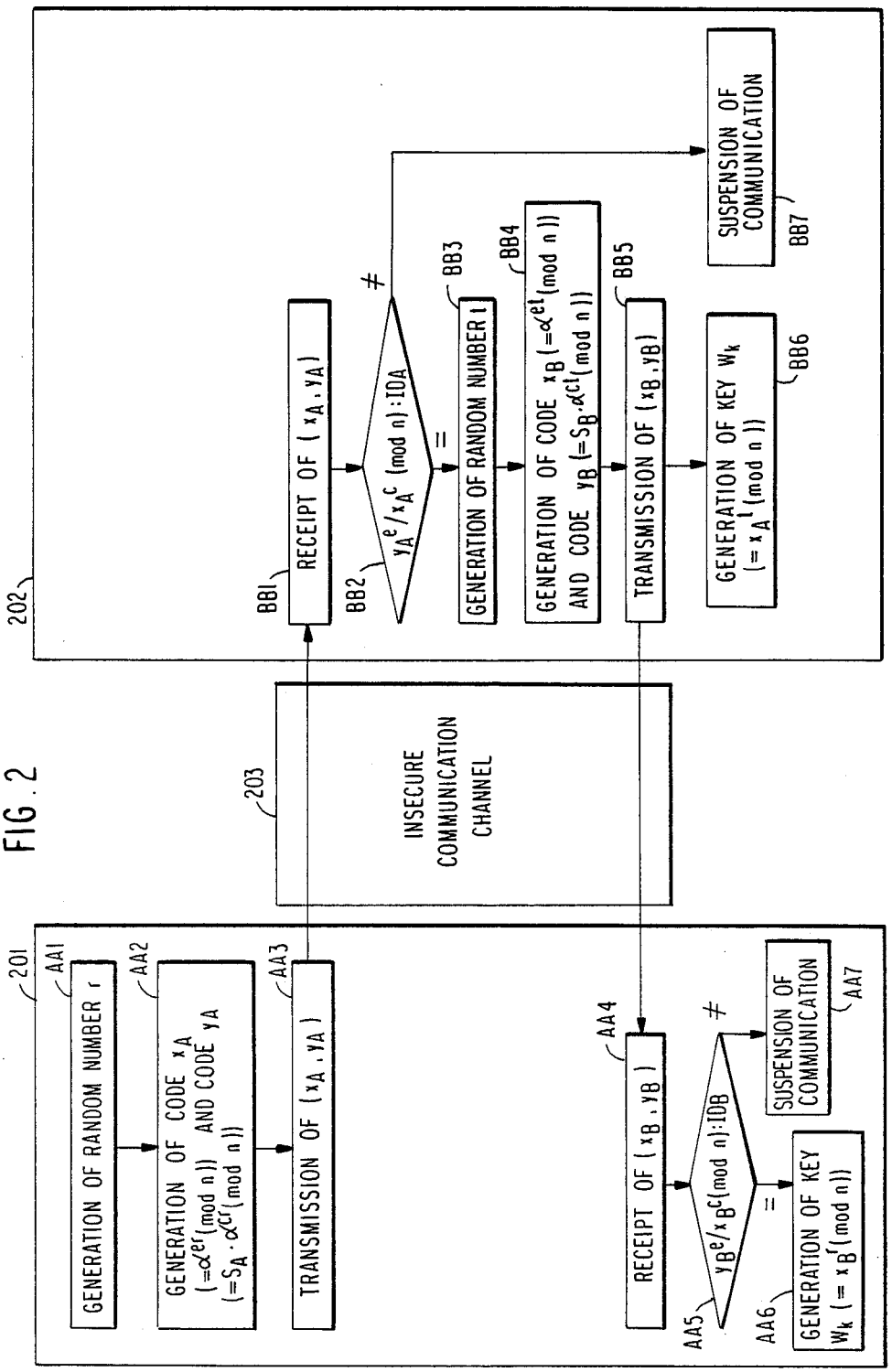
FIG. 2 is a block diagram of a second embodiment of the invention.

Referring now to FIG. 2, a second embodiment of the invention comprises a first system 201, a second system 202 and an insecure communication channel 203. It is assumed herein that the systems 201 and 202 are used by users A and B, respectively. The user A has or knows a secret integer number $S_A$ and public integer numbers e, c, α and n, which are not necessarily secret while the user B has or knows a secret integer number $S_B$ and the public integer numbers. These integer numbers are designated and distributed by a reliable person or organization in advance. The method to designate the integer numbers will be described later.

An operation of the embodiment will next be described on a case where the user A starts communication. The system 201 of the user A generates a random number γ (Step AA1 in FIG. 2) and determines a first key distribution code $X_A$ representative of a number obtained by computing $\alpha^{e \cdot r} \pmod{n}$ as well as a first identification code $Y_A$ indicative of a number obtained by computing $S_A \cdot \alpha^{c \cdot r} \pmod{n}$ (Step AA2). The system 201 then transmits a first pair of $X_A$ and $Y_A$ to the system 202 of the user B (Step AA3). Thereafter, the system 202 receives the first pair $(X_A, Y_A)$ (Step BB1), calculates $Y_A{}^e/X_A{}^c \pmod{n}$, and examines whether or not the number obtained by the calculation is identical to the number indicated by an identification code $ID_A$ obtained by the address, the name and so on of the user A in a similar manner to in the first embodiment (Step BB2). If they are not identical to each other, the system suspends processing of the key distribution (Step BB7). On the other hand, if they are identical to each other, the system 202 generates a random number t (Step BB3) and determines a second key distribution code $X_B$ representative of a number obtained by calculating $\alpha^{e \cdot t} \pmod{n}$ and a second identification code $Y_B$ obtained by calculating $S_B \cdot \alpha^{c \cdot t} \pmod{n}$ (Step BB4). The system 202 then transmits a second pair of $X_B$ and $Y_B$ to the system 201 of the user A (Step BB5). The system 202 calculates $X_A{}^t \pmod{n}$ and keeps the number thus obtained as a enciphering key wk (Step BB6).

The system 201, on the other hand, receives the second pair $(X_B, Y_B)$ (Step AA4), calculates $Y_B{}^e/X_B{}^c \pmod{n}$, and examines whether or not the number thus obtained is identical to the number indicated by an identification code $ID_B$ obtained by the address, the name and so on of the user B in a similar manner to in the first embodiment (Step AA5). If they are not identical to each other, the system suspends the key distribution processing (Step AA7). If they are identical to each other, the system 201 calculates $X_B{}^r \pmod{n}$, and stores the number thus obtained as a enciphering key wk (Step AA6). Although the codes $ID_A$ and $ID_B$ are widely known, they may be informed by the user A to the user B.

The integer numbers $S_A$, $S_B$, e, c, α and n are determined in the same manner as in the first embodiment. As a result, $ID_A$ and $ID_B$ becomes equal to $Y_A{}^e/X_A{}^c \pmod{n}$ $(= S_A{}^e \cdot \alpha^{erc}/\alpha^{erc} \pmod{n})$ and $Y_B{}^e/X_B{}^c \pmod{n}$ $(= S_B{}^e \cdot \alpha^{aetc}/\alpha^{etc} \pmod{n})$, respectively. If we presuppose that the above-mentioned reliable person or organization who prepared $S_A$ and $S_B$ do not act illegally, since $S_A$ is possessed only by the user A while $S_B$ is possessed only by the user B, the first pair $(x_A, y_A)$ which satisfies $y_A{}^e/x_A{}^c \pmod{n} = ID_A$ can be prepared only by the user A while the second pair $(x_B, y_B)$ which satisfies $y_B{}^e/x_B{}^c \pmod{n} = ID_B$ can be prepared only by the user B. It is impossible to find out a number x which satisfies $x^f \pmod{n} = ID_B$ on the basis of f, b and n since finding out X is equivalent to breaking the RSA public key cryptogram system disclosed in the above-mentioned article in the Communication of the ACM. It is described in the above-referenced article in IEEE Transactions on Information Theory that the key wk cannot be calculated from the codes $x_A$ or $x_B$ and n. The key distribution may be implemented similarly by making the integer number C variable and sending it from a user to another.

An example of the systems 101, 102, 201 and 202 to be used in the first and second embodiments will next be described referring to FIG. 3.

Figure 3:
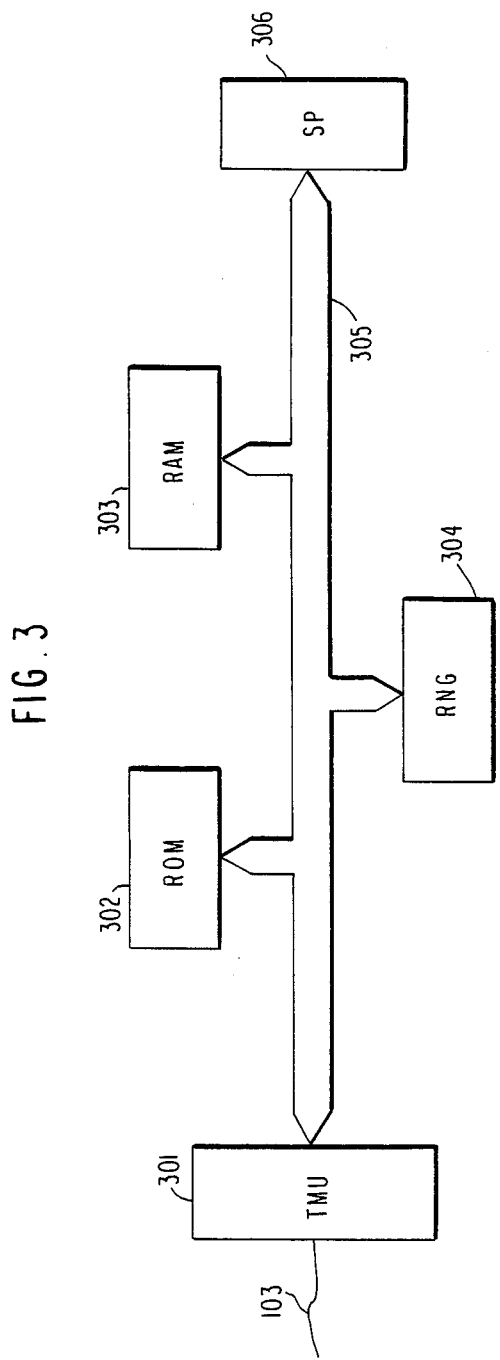
FIG. 3 is a block diagram of an example of systems 101, 102, 201 and 202.

Referring now to FIG. 3, a system comprises a terminal unit (TMU) 301 such as a personal computer equipped with communication processing functions, a read only memory unit (ROM) 302, a random access memory unit (RAM) 303, a random number generator (RNG) 304, a signal processor (SP) 306, and a common bus 305 which interconnects the TMU 301, the ROM 302, the RAM 303, the RNG 304 and the SP 306.

The RNG 304 may be a key source 25 disclosed in U.S. Pat. No. 4,200,700. The SP 306 may be a processor available from CYLINK Corporation under the trade name CY 1024 KEY MANAGEMENT PROCESSOR.

The RNG 304 generates random numbers r or t by a command given from the SP 306. The ROM 407 stores the public integer numbers e, c, $\alpha$, n and the secret integer number $S_A$ (if the ROM 407 is used in the system 101 or 201) or the secret integer number $S_B$ (if the ROM 407 is used in the system 102 or 202). The numbers $S_A$ and $S_B$ may be stored in the RAM 303 from the TMU 301 everytime users communicates. According to a program stored in the ROM 407, the SP 306 executes the above-mentioned steps A2, A5, AA2, AA5, AA6 and AA7 (if the SP 306 is used in the system 101 or 201), or the steps B3, B5, BB2, BB4, BB6 and BB7 (if the SP 306 is used in the system 102 or 202). The RAM 303 is used to temporarily store calculation results in these steps.

Each of the systems 101, 102, 201 and 202 may be a data processing unit such as a general purpose computer and an IC (integrated circuit) card.

As described in detail hereinabove, this invention enables users to effectively implement key distribution simply with a secret piece of information and several public pieces of information.

While this invention has thus been described in conjunction with the preferred embodiments thereof, it will now readily be possible for those skilled in the art to put this invention into practice in various other manners.

What is claimed is:

1. A key distribution method comprising the following steps:
   (a) generating a first random number in a first system in use by a first converser;
   (b) generating first key distribution information in said first system by applying a predetermined first transformation to said first random number on the basis of first secret information;
   (c) transmitting said first key distribution information to a second system in use by a second converser via a communication channel;
   (d) receiving said first key distribution information in said second system;
   (e) generating a second random number in said second system;
   (f) generating second key distribution information by applying said predetermined first transformation to said second random number on the basis of second secret information;
   (g) transmitting said second key distribution information to said first system via said communication channel;
   (h) receiving said second key distribution information in said first system; and
   (i) generating an enciphering key in said first system by applying a predetermined second transformation to said second key distribution information on the basis of said first random number and identification information of said second converser.

2. A key distribution method as claimed in claim 1, in which said first system includes first data processing means for executing said steps (a), (b) and (i), and first communication processing means for executing said steps (c) and (h).

3. A key distribution method as claimed in claim 1, in which said second system includes second data processing means for executing said steps (e) and (f), and second communication processing means for executing said steps (d) and (g).

4. A key distribution method as recited in claim 1, wherein s is a respective one of said first and second random numbers, S is a respective one of said first and second information numbers, $\alpha$ and n are fixed numbers, x is a respective one of said first and second key distribution informations, and said first transformation is represented by $x = S \cdot \alpha^s \pmod{n}$.

5. A key distribution method comprising the following steps:
   (a) generating a first random number in a first system in use by a first converser;
   (b) generating first key distribution information in said first system by applying a predetermined first transformation to said first random number on the basis of public information and generating first identification information of said first converser by applying a predetermined second transformation to said first random number on the basis of first secret information;
   (c) transmitting said first key distribution information and said first identification information to a second system in use by a second converser via a communication channel;
   (d) receiving said first key distribution information and said first identification information in said second system;
   (e) examining whether or not the result obtained by applying a predetermined third transformation to said first key distribution information to determine whether said first identification information satisfies a predetermined first condition and, if it does not satisfy, suspending key distribution processing;
   (f) generating a second random number if said first condition is satisfied at said step (e);
   (g) generating second key distribution information by applying said predetermined first transformation to said second random number on the basis of said public information, and generating second identification information of said second converser by applying said predetermined second transformation to said second random number on the basis of second secret information;
   (h) transmitting said second key distribution information and said second identification information to said first system via said communication channel; and
   (i) receiving said transmitted information and examining in said first system whether or not the result obtained by applying said predetermined third transformation to said second key distribution information on the basis of said second identification information satisfies a predetermined second condition and, if the result does not satisfy said second condition, suspending said key distribution processing or, if it satisfies said second condition, generating said enciphering key by applying a predetermined fourth transformation to said first random number on the basis of said second key distribution information.

6. A key distribution method as claimed in claim 5, in which said first system includes first data processing means for executing said steps (a), (b), and (i), and first communication processing means for executing said step (c).

7. A key distribution method as claimed in claim 5, in which said second system includes second data processing means for executing said steps (e), (f) and (g), and second communication processing means for executing said steps (d) and (h).

8. A key distribution method as claimed in claim 5, wherein s is a respective one of said first and second random numbers, x is a respective one of said first and second key distribution informations, y is a respective one of said first and second identification informations, S is a respective one of said first and second secret information, said public information comprises numbers e, c, α and n, said first transformation is represented by $$x = \alpha^{er}(mod\ n)$$

and said second transformation is represented by $$y = S\ \alpha^{cr}(mod\ n).$$

9. A key distribution system comprising a first system in use by a first converser and a second system in use by a second converser connected by a communication channel wherein said first and second systems comprise:
(a) means in said first system for generating a first random number;
(b) means in said first system for generating first key distribution information by applying a predetermined first transformation to said first random number on the basis of first secret information;
(c) means in said first system for transmitting said first key distribution information to said second system via said communication channel;
(d) means in said second system for receiving said first key distribution information;
(e) means in said second system for generating a second random number;
(f) means in said second system for generating second key distribution information by applying said predetermined first transformation to said second random number on the basis of second secret information;
(g) means in said second system for transmitting said second key distribution information to said first system via said communication channel;
(h) means in said first system for receiving said second key distribution information; and
(i) means in said first system for generating an enciphering key by applying a predetermined second transformation to said second key distribution information on the basis of said first random number and identification information of said second converser.

10. A key distribution system as claimed in claim 9, wherein s is a respective one of said first and second random numbers, x is a respective one of said first and second key distribution informations, y is a respective one of said first and second identification informations, S is a respective one of said first and second secret information, said public information comprises numbers e, c, α and n, said first transformation is represented by $$x = \alpha^{er}(mod\ n)$$

and said second transformation is represented by $$y = S\ \alpha^{cr}(mod\ n).$$

11. A key distribution system comprising a first system in use by a first converser and a second system in use by a second converser connected by a communication channel wherein said first and second systems comprise:
(a) means in said first system for generating a first random number;
(b) means in said first system for generating first key distribution information by applying a predetermined first transformation to said first random number on the basis of public information and generating first identification information of said first converser by applying a predetermined second transformation to said first random number on the basis of first secret information;
(c) means in said first system for transmitting said first key distribution information and said first identification information to said second system via said communication channel;
(d) means in said second system for receiving said first key distribution information and said first identification information;
(e) means in said second system for examining whether or not the result obtained by applying a predetermined third transformation to said first key distribution information to determine whether said first identification information satisfies a predetermined first condition and, if it does not satisfy, suspending key distribution processing;
(f) means in said second system for generating a second random number if said first condition is satisfied by said examining means;
(g) means in said second system for generating second key distribution information by applying said predetermined first transformation to said second random number on the basis of said public information, and generating second identification information of said second converser by applying said predetermined second transformation to said second random number on the basis of second secret information;
(h) means in said second system for transmitting said second key distribution information and said second identification information to said first system via said communication channel; and
(i) means in said first system for receiving said transmitted information and examining whether or not the result obtained by applying said predetermined third transformation to said second key distribution information on the basis of said second identification information satisfies a predetermined second condition and, if the result does not satisfy said second condition, suspending said key distribution processing or, if it satisfies said second condition, generating said enciphering key by applying a predetermined fourth transformation to said first random number on the basis of said second key distribution information.

12. A key distribution system as claimed in claim 11, wherein s is a respective one of said first and second random numbers, x is a respective one of said first and second key distribution informations, y is a respective one of said first and second identification informations, S is a respective one of said first and second secret information, said public information comprises numbers e, c, $\alpha$ and n, said first transformation is represented by $$x = \alpha^{er} \pmod{n}$$

and said second transformation is represented by $$y = S\, \alpha^{cr} \pmod{n}.$$

* * * * *